United States Patent
Wang

(10) Patent No.: US 8,767,392 B2
(45) Date of Patent: Jul. 1, 2014

(54) PORTABLE ELECTRONIC DEVICE

(75) Inventor: Chih-Kuang Wang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 206 days.

(21) Appl. No.: 13/302,919

(22) Filed: Nov. 22, 2011

(65) Prior Publication Data

US 2013/0128469 A1 May 23, 2013

(51) Int. Cl.
*H05K 7/00* (2006.01)

(52) U.S. Cl.
USPC ............... 361/679.55; 361/748; 361/679.23; 361/679.56; 361/679.59; 248/463; 248/187.1; 248/188.8

(58) Field of Classification Search
USPC ............ 361/748, 679.23, 679.55, 0.56, 0.59; 248/463, 187.1, 188.8
See application file for complete search history.

(56) References Cited

U.S. PATENT DOCUMENTS

| | | | | |
|---|---|---|---|---|
| 7,217,912 | B2 * | 5/2007 | Hwang | 250/208.1 |
| 7,386,282 | B2 * | 6/2008 | Kim et al. | 455/90.3 |
| 7,806,525 | B2 * | 10/2010 | Howell et al. | 351/158 |
| 2005/0195322 | A1 * | 9/2005 | Park et al. | 348/373 |
| 2008/0225139 | A1 * | 9/2008 | Nomura et al. | 348/240.3 |
| 2009/0111515 | A1 * | 4/2009 | Joo | 455/556.1 |
| 2010/0133414 | A1 * | 6/2010 | Lee et al. | 248/686 |

FOREIGN PATENT DOCUMENTS

| | | |
|---|---|---|
| DE | 10 2004 025 713 A1 | 12/2005 |
| DE | 20 2006 011 445 U1 | 2/2007 |
| EP | 1 955 106 B1 | 9/2011 |

* cited by examiner

*Primary Examiner* — Jayprakash N Gandhi
*Assistant Examiner* — Mukund G Patel
(74) *Attorney, Agent, or Firm* — Birch, Stewart, Kolasch & Birch, LLP

(57) ABSTRACT

A portable electronic device is provided. The portable electronic device includes a body, an operation interface, a supporting element and an image capturing unit. A receiving recess is formed on the body. The operation interface is disposed on the body. The supporting element is rotated between a first orientation and a second orientation relative to the body, wherein when the supporting element is in the first orientation, the supporting element is in the receiving recess, and when the supporting element is in a second orientation, an angle is formed between the supporting element and the body, wherein the angle is greater than 0 degree. The image capturing unit is disposed in the supporting element.

10 Claims, 6 Drawing Sheets

PORTABLE ELECTRONIC DEVICE

DESCRIPTION OF THE INVENTION

1. Field of the Invention

The present invention relates to a portable electronic device, and in particular relates to a portable electronic device with standing and image capturing functions.

2. Description of the Related Art

Portable electronic devices (for example, smartphones) have gradually been provided with more and more multimedia functions. Therefore, the portable electronic device needs to stand on a supporting surface (for example, table surface) with a particular standing angle. However, conventional portable electronic devices are flat devices with no standing function.

SUMMARY OF THE INVENTION

In one embodiment of the invention, a portable electronic device is provided. The portable electronic device includes a body, an operation interface, a supporting element and an image capturing unit. A receiving recess is formed on the body. The operation interface is disposed on the body. The supporting element is rotated between a first orientation and a second orientation relative to the body, wherein when the supporting element is in the first orientation, the supporting element is in the receiving recess, and when the supporting element is in a second orientation, an angle is formed between the supporting element and the body, wherein the angle is greater than 0 degree. The image capturing unit is disposed in the supporting element.

Utilizing the portable electronic device of the embodiment of the invention, the portable electronic device can stably stand on the supporting surface (for example, table surface) allowing users to watch video images therefrom. Additionally, since the image capturing unit is disposed in the supporting element, the inner space of the portable electronic device is saved, and the portable electronic device can be placed in higher or lower positions to capture images with different capturing angles.

A detailed description is given in the following embodiments with reference to the accompanying drawings:

DETAILED DESCRIPTION OF THE INVENTION

FIG. 1A shows a first surface of a portable electronic device of an embodiment of the invention. FIG. 1B shows a second surface of the portable electronic device of the embodiment of the invention. FIG. 1C shows a standing state of the portable electronic device of the embodiment of the invention. With reference to FIGS. 1A, 1B and 1C, the portable electronic device 100 includes a body 110, an operation interface 120, a supporting element 130 and an image capturing unit. The body 110 has a first surface 111, a second surface 112 and a receiving recess 113. The first surface 111 is opposite to the second surface 112, and the receiving recess 113 is formed on the second surface 112. The operation interface 120 is disposed on the first surface 111 of the body 110. The supporting element 130 is disposed on the second surface 112 of the body 110. The supporting element 130 is rotated between a first orientation (FIG. 1B) and a second orientation (FIG. 1C) relative to the body 110. When the supporting element 130 is in the first orientation (FIG. 1B), the supporting element 130 is in the receiving recess (113), and when the supporting element 130 is in a second orientation (1C), a angle θ is formed between the supporting element 130 and the body 110, wherein the angle θ is greater than 0 degree. The image capturing unit is disposed in the supporting element 130.

The operation interface 120 can be a touch screen. The angle θ is between 0~90 degrees, and is preferred to be between 30~60 degrees. The angle range disclosed above does not restrict the invention, and the angle θ can be modified in different designs.

FIG. 2A is a side view of the supporting element 130 of the embodiment of the invention, wherein the supporting element 130 is in the first orientation. FIG. 2B is a side view of the supporting element 130 of the embodiment of the invention, wherein the supporting element 130 is in the second orientation. With reference to FIGS. 2A and 2B, the body 110 comprises a pivot base 131. The supporting element 130 comprises a housing 132 and a supporting portion 133. The pivot base 131 is fixed in the body 110. The housing 132 pivots on the pivot base 131. The supporting portion 133 is connected to the housing 132. FIG. 3 is an exploded view of the supporting element 130 of the embodiment of the invention. The image capturing unit 140 is disposed in the housing 132. The image capturing unit 140 comprises an image capturing module 141 and a cable 142.

In one embodiment, the housing 132 is rotated relative to the pivot base 131 within the angle θ of 30~60 degrees. The housing 132 is tightly fitted to the pivot base 131. Therefore, the housing 132 can be free stopped in any position between 30~60 degrees. In another embodiment, the housing 132 can only be stopped in 30 degrees and 60 degrees (one stop).

With reference to FIGS. 1C and 3, the housing 132 comprises an image capturing window 134 and two flash windows 135, and the image capturing window 134 and the flash windows 135 are corresponding to the image capturing unit 140.

FIG. 4 is a sectional view along the IV-IV direction of FIG. 1C, wherein an opening 114 and a hollow portion 115 are formed in the receiving recess 113. In one embodiment, the housing 132 is partially inserted into the hollow portion 115 to further reduce the dimension of the portable electronic device. The cable 142 extends into the body 110 through the opening 114. The portable electronic device of the embodiment of the invention further comprises a circuit board 150 and a connector 151. The circuit board 150 comprises a circuit board surface 152. The connector 151 is disposed on the circuit surface 152. The cable 142 is connected to the connector 151. The circuit board surface 152 faces the operation interface (120).

With reference to FIG. 1C, when the supporting element is in the second orientation (supporting state), the portable electronic device can stably stand on the supporting surface (for example, table surface) allowing users to watch video images therefrom. Additionally, with reference to FIG. 5A, in one image capturing state (can be selected through software), the image capturing unit of the portable electronic device captures an image in an upward direction allowing a user to take the image with a lower capturing angle.

With reference to FIG. 5B, in another image capturing state (rotating the portable electronic device for 180 degrees), the image capturing unit of the portable electronic device captures an image in a downward direction allowing a user to take the image with a higher capturing angle.

When the supporting element is in the first orientation, the portable electronic device can also capture images. The embodiments disclosed above do not restrict the invention.

Utilizing the portable electronic device of the embodiment of the invention, the portable electronic device can stably stand on the supporting surface (for example, table surface) allowing a user to watch video images therefrom. Additionally, since the image capturing unit is disposed in the supporting element, an inner space of the portable electronic device is saved, and the portable electronic device can be placed in higher or lower positions to capture images with different capturing angles.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

DESCRIPTION OF MAIN REFERENCE NUMERALS

Figure 1A:
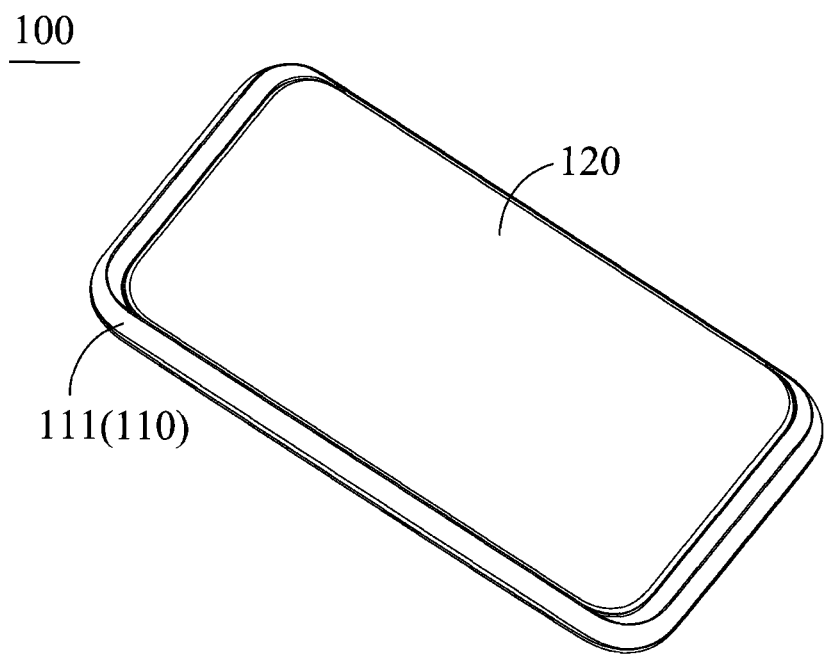
FIG. 1A shows a first surface of a portable electronic device of an embodiment of the invention.
Figure 1B:
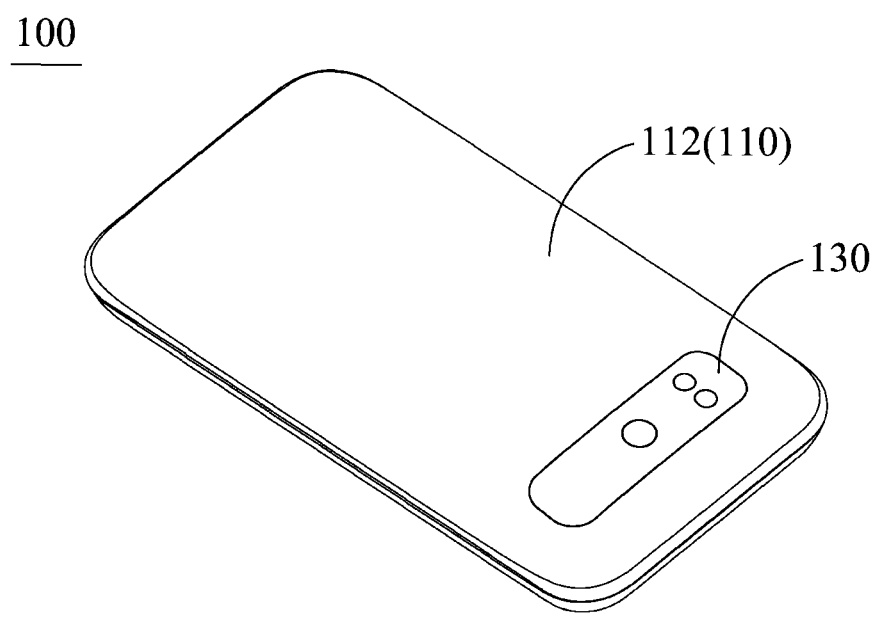
FIG. 1B shows a second surface of the portable electronic device of the embodiment of the invention.
Figure 1C:
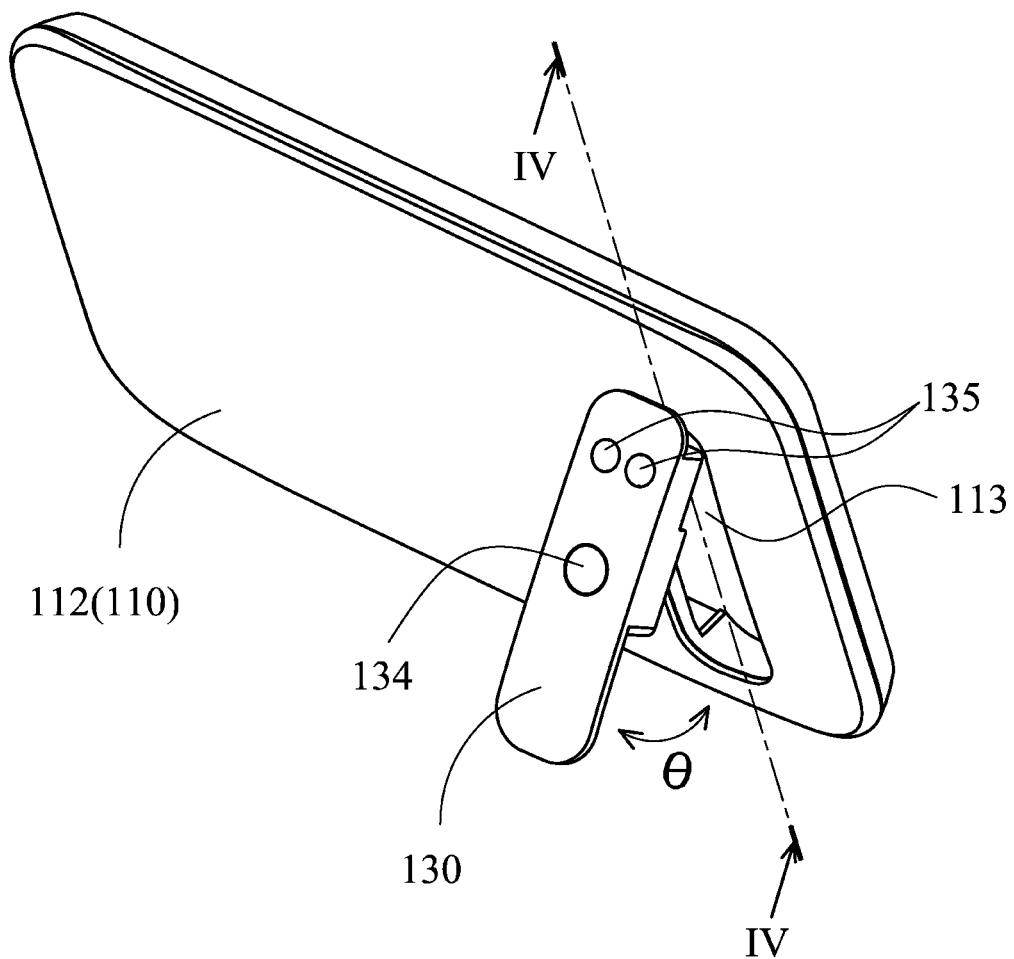
FIG. 1C shows a standing state of the portable electronic device of the embodiment of the invention.
Figure 2A:
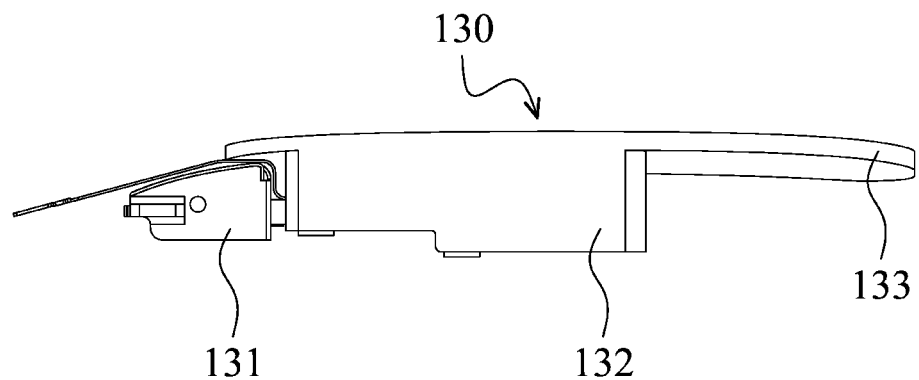
FIG. 2A is a side view of a supporting element of the embodiment of the invention, wherein the supporting element is in the first orientation.
Figure 2B:
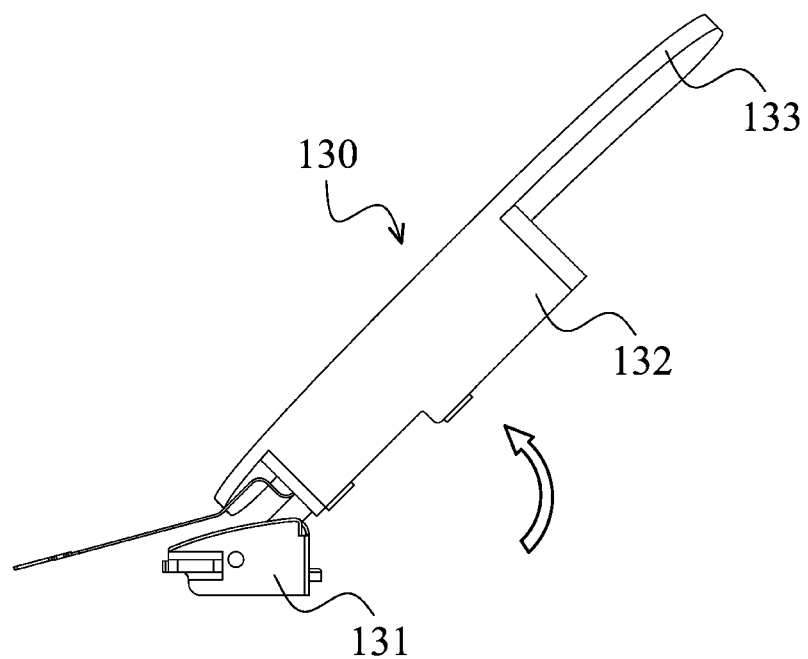
FIG. 2B is a side view of the supporting element of the embodiment of the invention, wherein the supporting element is in the second orientation.
Figure 3:
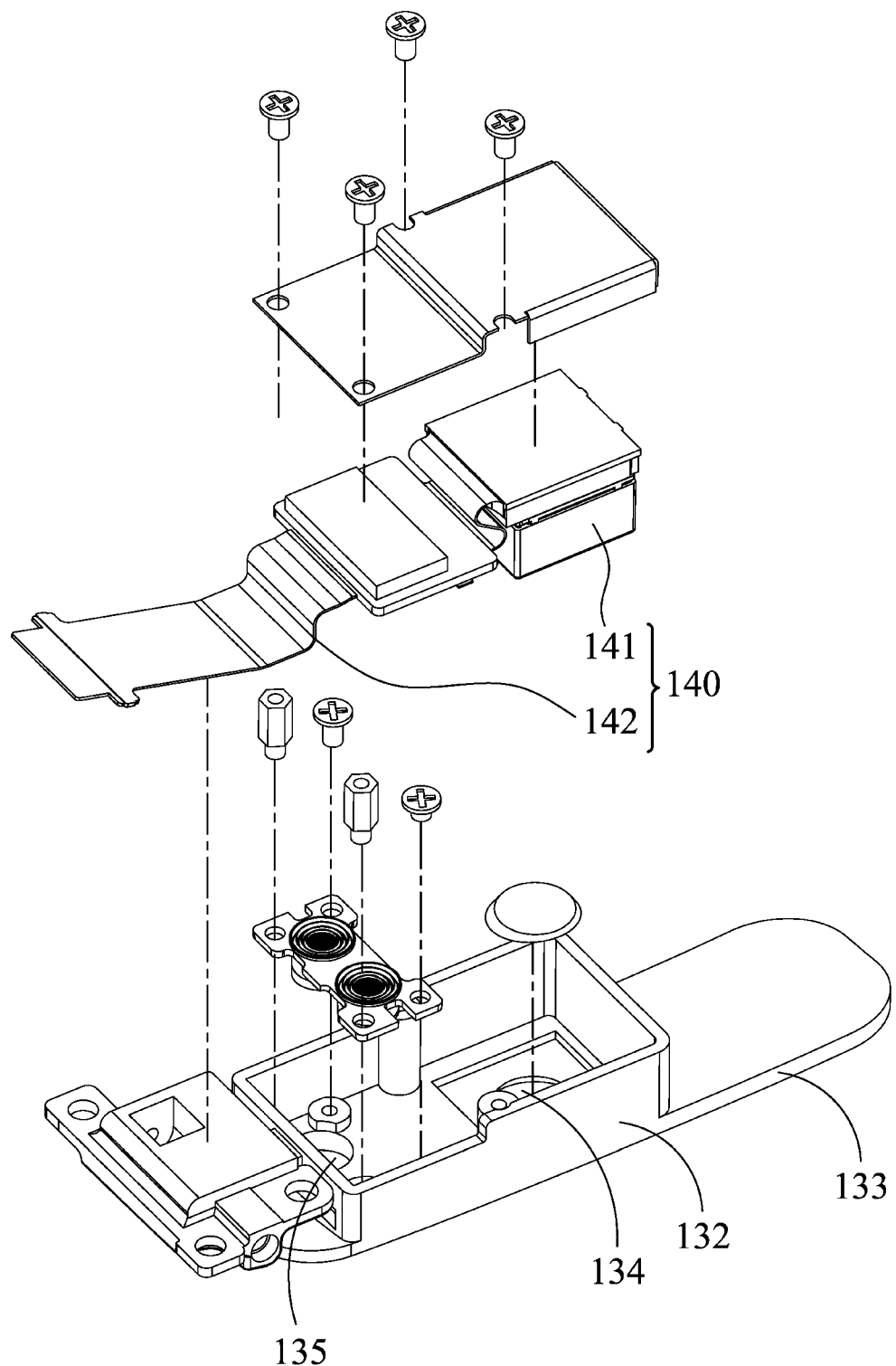
FIG. 3 is an exploded view of the supporting element of the embodiment of the invention.
Figure 4:
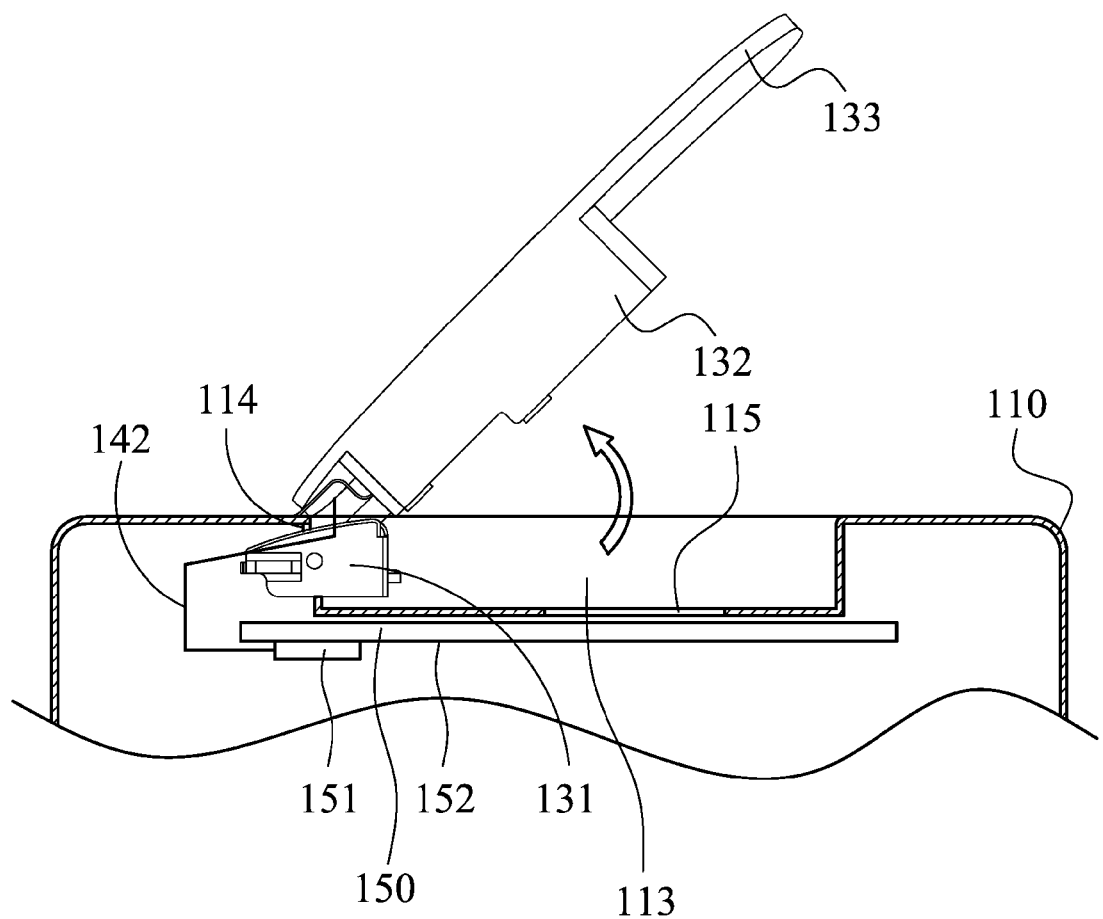
FIG. 4 is a sectional view along the IV-IV direction of FIG. 1C.
Figure 5A:
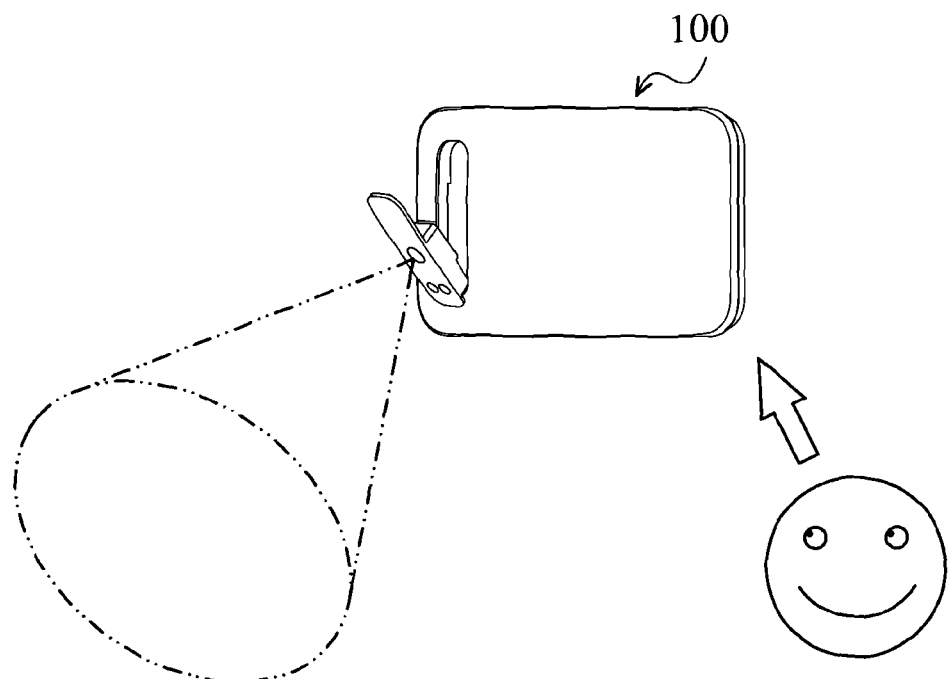
FIG. 5A shows the portable electronic device of the embodiment of the invention capturing an image with a lower capturing angle.
Figure 5B:
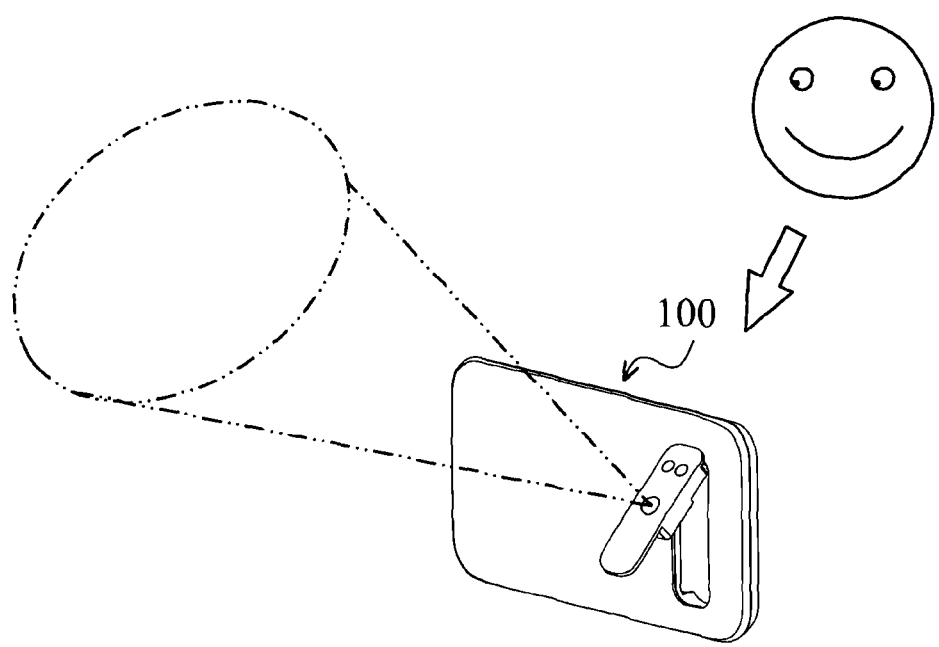
FIG. 5B shows the portable electronic device of the embodiment of the invention capturing an image with a higher capturing angle.

100~portable electronic device
110~body
111~first surface
112~second surface
113~receiving recess
114~opening
115~hollow portion
120~operation interface
130~supporting element
131~pivot base
132~housing
133~supporting portion
134~image capturing window
135~flash windows
140~image capturing unit
141~image capturing module
142~cable
150~circuit board
151~connector
152~circuit board surface

What is claimed is:

1. A portable electronic device, comprising:
a body, including a rear surface;
an operation interface, disposed on front surface of the body;
a camera module, movably attached to a part of the rear surface of the body and movable between a first orientation with respect to the body and a second orientation with respect to the body, the second orientation being different from the first orientation, the camera module being stationary in both of the first and second orientations; and
an image capturing unit, disposed in the camera module,
wherein the image capturing unit is configured to capture a first image in the first orientation with respect to the body, and capture a second image in the second orientation with respect to the body, and
wherein the body comprises a pivot base, the camera module comprises a housing and a supporting portion, the pivot base is fixed in the body, the housing pivots on the pivot base, the supporting portion is connected to the housing, and the image capturing unit is disposed in the housing.

2. The portable electronic device as claimed in claim 1, wherein an angle is formed between the camera module and the body when the camera module is in the second orientation, and the angle is between 30~60 degrees.

3. The portable electronic device as claimed in claim 1, wherein the body further includes a front surface opposite to the rear surface.

4. The portable electronic device as claimed in claim 3, wherein the operation interface is disposed on the front surface.

5. The portable electronic device as claimed in claim 1, wherein the operation interface is a touch screen.

6. The portable electronic device as claimed in claim 1, wherein the housing comprises an image capturing window and a flash window, and the image capturing window and the flash window are corresponding to the image capturing unit.

7. The portable electronic device as claimed in claim 1, wherein the housing is tightly fitted to the pivot base.

8. The portable electronic device as claimed in claim 1, wherein the image capturing unit comprises an image capturing module and a cable, an opening is formed in the receiving recess, and the cable extends into the body through the opening.

9. The portable electronic device as claimed in claim 8, further comprising a circuit board and a connector, the circuit board comprises a circuit board surface, the connector is disposed on the circuit board surface, the cable is connected to the connector, and the circuit board surface faces the operation interface.

10. The portable electronic device as claimed in claim 1, wherein in an image capturing state, the camera module is in the second orientation.

* * * * *